United States Patent Office 3,049,520
Patented Aug. 14, 1962

3,049,520
PROCESS FOR THE PREPARATION OF AN AUXILIARY SUSPENDING AGENT TO BE USED FOR OBTAINING, BY A SUSPENSION POLYMERIZATION PROCESS, POLYVINYL CHLORIDE HAVING A HIGH POROSITY AND A NON-GLASSLIKE SURFACE
Giorgio Gatta and Gianni Benetta, Milan, Italy, assignors to Sicedison S.p.A., Milan, Italy, a company of Italy
No Drawing. Filed Aug. 27, 1959, Ser. No. 836,346
Claims priority, application Italy Dec. 17, 1958
3 Claims. (Cl. 260—85.7)

This invention relates to a process for copolymerizing vinylacetate with allyl alcohol; more particularly it relates to suspension- and emulsion-copolymerization processes of vinyl acetate with allyl alcohol.

The product obtained by the process according to the invention is suitable to be used as secondary suspending agent in the suspension polymerization of vinyl chloride, to obtain granular, high porosity polyvinyl chloride, which can readily be mixed with plasticizer and which is furthermore substantially free from the so-called "fish-eyes."

The satisfactory properties imparted to granular polyvinyl chloride, produced in suspension, by the copolymer of this invention, are exalted when vinyl chloride is polymerized in an aqueous medium in the presence of a polymerization catalyst, and of an heteropolymer of vinyl-acetate with maleic acid or with maleic anhydride. It is well known that this heteropolymer, which is the primary suspending agent, can be prepared by polymerizing mixtures of vinyl acetate and maleic anhydride or maleic acid, in various molar ratios (e.g. from 1:9 to 9:1).

It is generally preferred to use maleic anhydride so that the ratio maleic anhydride to vinyl acetate is 1:1. These suspending agents are well known compounds and can be prepared according to the process disclosed in the U.S. Patent No. 2,562,852, to M. Baer.

The considerable increase in the absorption velocity of the plasticizer and the decrease in the number of the so-called "fish eyes" of granular polyvinyl chloride obtained by suspension polymerization, with the aid of a secondary suspending agent of the kind suggested by this invention, as compared with the polyvinyl chloride obtained with the same process of suspension polymerization using the same maleic suspending agents, and different secondary suspending agents, will be illustrated by the examples to follow.

It is an object of this invention to provide a process of preparation, by means of polymerization in suspension or in emulsion, of a copolymer vinyl acetate-allyl alcohol.

A further object of this invention is to provide improvements in the process of suspension-polymerization of vinyl chloride and its copolymers by using the product of this invention.

A further object is to provide a product which, when used in the suspension-polymerization of vinyl chloride, is capable of modifying its properties so as to obtain high porosity-and non glasslike-surface-grains.

Further objects of this invention will be apparent to those skilled in the art.

According to the process of this invention, it has been found that the preparation of the copolymer vinyl acetate-allyl alcohol, capable of imparting the polyvinyl chloride good colloidal properties and a high plasticizer absorptivity, must be performed either in suspension or emulsion.

The process of suspension-polymerization is performed by reacting a mixture of monomers consisting of from 3 to 30 parts by weight of allyl alcohol, and from 97 to 70 parts of vinyl acetate in 25–400 parts of water, together with from 0.1 to 5 parts of a water insoluble polymerization catalyst, of the peroxide type, such as lauroyl, benzoyl, tolyl, acetyl, propionyl peroxide, etc., or of the azo-type, such as 2-azodiisobutyronitrile and diazoaminobenzene. Mixtures of two catalysts can be used if desired.

Any product presently used for this purpose can be employed as suspending agent, recalling that, should the copolymer be used in the polymerization of a polyvinyl chloride suitable for electric purposes, a suspending agent shall be used either of the non-ionic type, or of the ionic type, but free from alkali- and alkaline-earth ions.

Polymerization is performed under atmospheric pressure at a temperature ranging from 40 to 67° C. approximately, or under autogenous pressure at a temperature ranging from 67° to 150° C.

Depending upon the conditions, polymerization is carried on for a certain number of hours.

The purification of the polymer can be effected by distilling under vacuum the unreacted monomers and also part of the water. The last traces of monomers can be removed by introducing benzene or ethyl alcohol or dichloroethane or a similar solvent and removing then completely monomers and solvents, by distillation, preferably under vacuum.

The final polymeric mass which is suspended in water is discharged from the reaction vessel and can be dried under vacuum, and the product, which appears as a gummy, whitish mass, can be used as such, or dissolved in a suitable solvent. The solvent should be such as not to substantially impair the progress of polymerization of vinyl chloride.

In particular, good results are attained by using a copolymer with an ultimate allyl alcohol content from 5 to 10% by weight, having a molecular weight characterized by a specific viscosity, measured on solutions of 1 gr. of copolymer in 100 cc. of cyclohexanone at 25° C., ranging from 0.120 and 0.170 such a copolymer being obtained by polymerizing for 48 hours at 67° C. and under atmospheric pressure, 10 parts allyl alcohol and 90 parts vinyl acetate, 2 parts lauroyl peroxide, 0.15 part of an interpolymer vinyl-acetate-maleic anhydride (VAMA) in 100 parts water. The polymerization conversion (as regards the cited example) is of the order of from 35 to 40%.

Unreacted monomers can be recovered and used in a subsequent batch.

In the suspension-polymerization of vinyl chloride, the copolymer is used by adding it under the form hydroalcoholic super-saturated solution containing 50% in weight approximately of copolymer.

The alcohol used for said solution of the copolymer can be either ethyl alcohol or methyl alcohol, denatured with substances which do not disturb the polymerization of the vinyl chloride.

The emulsion polymerization is carried out in the presence of 1–6% of an emulsifying agent, either anionic, or nonionic, of 1–5% of a water-soluble promoter, such as hydrogen peroxide, ammonium persulphate, potassium persulphate, etc. and possibly, of small amounts of a reducing substance, such as, for instance, sodium bisulphite, acetic aldehyde, etc., in 50–250 parts of water.

The reaction temperature can be kept between 40 and 67° C., under atmospheric pressure, or between 67 and 150° C. under autogenous pressure.

The activating complex can be initially added as a whole, or by increments as the reaction progresses.

The purification complex is equal to the one employed in the suspension process.

The reaction velocity, in this instance, is higher, so that very high yields can be obtained in a reasonable time.

The auxiliary suspending agent which is the subject of this invention, is used in the suspension polymerization of vinyl chloride together with the maleic suspending agent (VAMA).

The amounts which can be used are 0.05 to 2 parts of vinyl acetate allyl-alcohol copolymer (VA/AA) and 0.09 to 2 parts of VAMA for 100 parts of monomers.

Good results are obtained by using 0.15 part VAMA and 0.2 part VA/AA.

The following examples will better illustrate what has been heretofore said. Some examples refer to the preparation of the vinyl acetate-allyl alcohol (VA/AA) copolymer of this invention, whereas some others point out the excellent qualities imparted by said copolymer to polyvinyl chloride and copolymers of vinyl chloride, in suspension.

The following examples are given to illustrate more clearly the principle and the practice of this invention to those who are skilled in the art, but these examples do not limit the invention.

*Example I*

100 parts of water, 90 parts of vinyl acetate, 10 parts allyl alcohol, 2 parts of lauroyl peroxide, 0.15 part of VAMA reacted in a 100-gallon enamel-lined autoclave, equipped with a reflux condenser, a blade stirrer and a heating jacket.

The autoclave, before the reaction, was scavenged with nitrogen. The polymerization was carried out for 48 hours, at 67° C. and under atmospheric pressure. After this time unreacted nonomers were distilled under vacuum, together with about 50% of the initial water. 300 parts of commercially pure benzene, to be distilled together with a further 25% approximately of the original water and the last traces of monomers, were then introduced into the autoclave. 70 parts of 95% ethyl alcohol were then added to obtain a super-saturated solution of the polymer at about 50%.

This solution was discharged at 30° C. and used for the test referred to in the Examples III, IV, V, VI.

*Example II*

85 parts of vinyl acetate, 15 parts allyl alcohol, 6 parts polyvinyl alcohol (in 10% aqueous solution), 1 part 20% hydrogen peroxide and 100 parts water were reacted in a flask, equipped with reflux condenser and electric heating mantle, after having removed oxygen from the flask.

The temperature of the mass was adjusted to about 67° C. and after about 1 hour reaction 0.5 additional parts 20% $H_2O_2$ were added. The mass was reacted for 18 hours after which the reaction is discontinued; a good, stable emulsion was obtained. Water and unreacted monomers were distilled under vacuum, a certain amount of benzene was added, which was then removed together with a part of the water by distillation under vacuum, and eventually the product was dissolved in methanol.

Methanol was eventually removed by distillation, and the product was dried in an oven under vacuum at about 60° C.

The product appeared as a yellowish very viscous mass which becomes fluid at a temperature of 40–50° C.

*Example III*

Vinyl chloride was polymerized by using the polymerization method hereinafter described:

| Component: | Parts by weight |
|---|---|
| Water | 150 |
| Vinyl chloride | 100 |
| VAMA (primary suspending agent) | 0.15 |
| VA–AA (secondary suspending agent prepared as in Example I) | 0.2 |
| Lauroyl peroxide | 0.15 |

The above listed components were charged in a 100-gallon-glass lined, steel autoclave, wherefrom before the introduction of the vinyl chloride, oxygen had been removed. The polymerization was carried out at 52° C. for about 12 hours, under energetic stirring.

This apparatus was also used for the following examples.

The vinyl chloride polymer which was obtained was granular, fine, and the grains are highly porous, their surface being non-glasslike. These two characteristics result in the fact that the powder is capable of incorporating very rapidly the plasticizer; furthermore, plastified films obtained at the roll-mill show an irrelevant number of "fish-eyes" (good colloidal properties).

On the other hand, by using in lieu of vinyl-acetate-allyl alcohol the same amount of another conventional auxiliary suspending agent, e.g. glycerylmonostearate and leaving the quantities of the other components unaltered, grains are obtained, which are less porous, with numerous glasslike surface particles, which give rise to "fish eyes." A numerous series of tests was conducted, by polymerizing vinyl chloride using alternatively as a secondary suspending agent VA/AA and glycerylmonostearate (GMS).

The average results can be summarized in the following table:

| Batches | with VA-AA | with GMS |
|---|---|---|
| "Fish eyes" (colloidal properties [1] expressed in number of "fish eyes"). | very good—less than 20. | bad—more than 250. |
| Absorption velocity of the plasticizer [2] in minutes. | 6 min | 10 min. |

[1] Test method: Colloidal properties are measured according to the number of "fish eyes" of a diameter larger than 0.2 mm. which are registered on a 20 cm. x 20 cm. side square, cut out of a thin film blackened with carbon black, obtained by calendering at 150° c. of a compound of 80 gr. polyvinyl chloride, 40 gr. dioctyl phthlate (DOP), 0.8 gr. cadmium stearate, and 2.4 gr. of a coloring compound consisting of PVC, DOP, cadmium stearate and carbon black.
[2] The absorption velocity of the plasticizer is measured by stirring with a suitable blendor 100 parts polyvinyl chloride with 50 parts DOP in a thermostat at 100° C. and sampling every 15 seconds the compound which is pressed against a filter paper sheet. It is observed whether the sample stains the paper.

As soon as the plasticizer has been completely absorbed, no stains will be formed. This time, given in minutes and seconds is taken as an index of the absorption velocity of the plasticizer.

*Example IV*

It is known that to obtain particles of granular, good porosity PVC by the suspension-process, the expedient can be adopted of stopping the polymerization of the vinyl chloride when the conversion is not yet complete (for example 75 to 80%), and of degasing the unreacted vinyl chloride.

Several charges have been conducted in 100 gallon autoclaves polymerizing vinyl chloride alternatively with VA–AA as auxiliary suspending agent, and with GMS, according to what has been already said in Example III, stopping however the conversion at 75% approx. The polymer obtained with VA–AA is much more porous than that obtained with GMS: the average value of the absorption velocity of the plasticizer is 3 minutes in the former instance, compared with 5 to 6 mins. in the latter.

*Example V*

Example III is repeated but for the fact that the monomer charge consists of 96 parts of vinyl acetate and 4 parts vinyl chloride. Results are obtained which are anologous to those already disclosed. In particular "fish eyes" are substantially eliminated.

*Example VI*

Example III is repeated but for the fact that the monomer charge consists of 82 parts of vinyl chloride and 18 parts vinyl aceate and the polymerization temperature is 67° C. Results are obtained which are analogous to those pointed out above. In particular, "fish eyes" are substantially eliminated.

The foregoing disclosure and, more particularly, the given examples have a merely illustrative value.

We claim:

1. The method of preparing an auxiliary suspending agent suitable for employment in the suspension-polymerization of vinyl chloride, comprising refluxing a mixture of from 70 to 97 parts by weight of vinyl acetate and 3 to 30 parts by weight of allyl alcohol in 25 to 400 parts of water containing an organic polymeric suspending agent, said refluxing carried out for a period of from 18 to 48 hours in a temperature range of 40° to 67° C. and at atmospheric pressure, said refluxing carried out in the presence of a polymerization catalyst selected from the group consisting of: hydrogen, lauroyl, benzoyl, tolyl, acetyl, and propionyl peroxide, and of 2-azodiisobutyronitrile and diazoaminobenzene.

2. The method of preparing an auxiliary suspending agent suitable for employment in the suspension-polymerization of vinyl chloride, comprising refluxing a mixture of from 85 to 90 parts by weight of vinyl acetate and 15 to 10 parts by weight of allyl alcohol in 100 parts of water containing an organic polymeric suspending agent, said refluxing carried out for a period of from 18 to 48 hours in a temperature range of from 40° to 67° C. and at atmospheric pressure, said refluxing carried out in contact with one of the polymerization catalysts from the group consisting of; hydrogen, lauroyl, benzoyl, tolyl, acetyl, and propionyl peroxide, and of 2-azodiisobutyronitrile and diazoaminobenzene.

3. The method of claim 1 wherein the mixture is admixed with a polyvinyl alcohol.

References Cited in the file of this patent
UNITED STATES PATENTS
2,917,494    Martin _____ Dec. 15, 1959